US008890767B2

(12) United States Patent
Choi et al.

(10) Patent No.: US 8,890,767 B2
(45) Date of Patent: Nov. 18, 2014

(54) ACTIVE METAMATERIAL DEVICE AND MANUFACTURING METHOD OF THE SAME

(75) Inventors: Choon Gi Choi, Daejeon (KR); Muhan Choi, Daejeon (KR); Sung-Yool Choi, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 298 days.

(21) Appl. No.: 13/431,142

(22) Filed: Mar. 27, 2012

(65) Prior Publication Data

US 2013/0002520 A1 Jan. 3, 2013

(30) Foreign Application Priority Data

Jun. 28, 2011 (KR) ........................ 10-2011-0062935

(51) Int. Cl.
*G02B 27/00* (2006.01)
*H01Q 15/00* (2006.01)

(52) U.S. Cl.
CPC ......... *H01Q 15/0086* (2013.01); *Y10S 977/734* (2013.01)
USPC .................... 343/909; 977/734; 257/E31.124

(58) Field of Classification Search
CPC .................................................. H01Q 15/0086
USPC .................................................. 977/734–741
See application file for complete search history.

(56) References Cited

U.S. PATENT DOCUMENTS

| | | | | |
|---|---|---|---|---|
| 8,648,306 | B1 * | 2/2014 | Goertz et al. | 250/340 |
| 2007/0126045 | A1 * | 6/2007 | Choi et al. | 257/310 |
| 2007/0189666 | A1 * | 8/2007 | Kornilovich | 385/30 |
| 2009/0262766 | A1 | 10/2009 | Chen et al. | |
| 2010/0109972 | A2 * | 5/2010 | Xu et al. | 343/911 R |
| 2010/0290503 | A1 * | 11/2010 | Rumpf et al. | 374/163 |
| 2012/0268809 | A1 * | 10/2012 | Guo et al. | 359/359 |
| 2013/0193404 | A1 * | 8/2013 | Koppens et al. | 257/9 |

OTHER PUBLICATIONS

With Lu et al. ("High-Order THz Bandpass Filters Achieved by Multilayer Complementary Metamaterial Structures" 35th Intl. Conf. on Infrared Millimiter and Terahertz Waves, Sep. 5-10, 2010).*
Hou-Tong Chen et al., "Active terahertz metamaterial devices", Nature, Nov. 30, 2006, pp. 597-600, vol. 444, Nature Publishing Group.

* cited by examiner

*Primary Examiner* — Dameon E Levi
*Assistant Examiner* — Ricardo Magallanes

(57) ABSTRACT

Provided are an active metamaterial device operating at a high speed and a manufacturing method thereof. The active metamaterial device includes a first dielectric layer, a lower electrode disposed on the first dielectric layer, a second dielectric layer disposed on the lower electrode, metamaterial patterns disposed on the second dielectric layer, a couple layer disposed on the metamaterial patterns and the second dielectric layer, a third dielectric layer disposed on the couple layer, and an upper electrode disposed on the third dielectric layer.

12 Claims, 10 Drawing Sheets

ACTIVE METAMATERIAL DEVICE AND MANUFACTURING METHOD OF THE SAME

CROSS-REFERENCE TO RELATED APPLICATIONS

This U.S. non-provisional patent application claims priority under 35 U.S.C. §119 of Korean Patent Application No. 10-2011-0062935, filed on Jun. 28, 2011, the entire contents of which are hereby incorporated by reference.

BACKGROUND

The present invention disclosed herein relates to an active metamaterial device and a manufacturing method of the same, and more particularly, to an active metamaterial device in which graphene is applied and a manufacturing method of the same.

A metamaterial may include an artificial material in which artificial structures are periodically arranged instead of atoms and molecules. The structures inside the metamaterial may be much bigger than molecules. Thus, the path in which an electromagnetic wave passing through the metamaterial progresses may be interpreted by macroscopic Maxwell equations. On the other hand, the structures inside the metamaterial may have a size much smaller than an working electromagnetic wavelength. Therefore, the metamaterial may include structures of shapes and sizes in which macroscopic material response characteristics can be created from the electromagnetic responses of an array of the designed patterns. The metamaterial is formed of a typical material such as a conductor or semiconductor, and its collective characteristics are changed by arranging it in extremely small repetitive patterns. Therefore, the metamaterial may control electromagnetic waves in a manner not possible with a general material.

A typical technique for actively controlling the characteristics of a metamaterial includes a method of changing the properties of a base material of the metamaterial by applying a direct current (DC) electric field to the metamaterial. In this method, a metamaterial is first designed on a semiconducting base material through a metal pattern and metamaterial unit cells connected to one electrode so as to effectively form Schottky diodes around the metamaterial unit cells when a DC bias voltage is applied from outside. When a DC voltage is applied to the metamaterial metal pattern through an ohmic contact region, a charge depletion region is formed near the metamaterial unit cell. As a result, the electrical conductivity of the semiconducting base material contacting the metamaterial is changed, optical properties such as the transmittance/refractive index of the metamaterial are changed accordingly, and the foregoing is applied to a metamaterial switching device or phase modulator. In addition to the foregoing method, a metamaterial has been developed, in which the overall metamaterial properties are controlled by changing the metamaterial's base material properties through the use of electrical or thermal phase transition. A phase transition type device has the disadvantage of a slow operating speed.

SUMMARY

The present invention provides an active metamaterial device operating at a high speed and a manufacturing method of the same.

The present invention also provides a flexible active metamaterial device and a manufacturing method of the same.

Embodiments of the present inventive concept provide active metamaterial devices including: a first dielectric layer; a lower electrode disposed on the first dielectric layer; a second dielectric layer disposed on the lower electrode; metamaterial patterns disposed on the second dielectric layer; a couple layer disposed on the metamaterial patterns and the second dielectric layer; a third dielectric layer disposed on the couple layer; and an upper electrode disposed on the third dielectric layer.

In some embodiments, the couple layer may include graphene.

In other embodiments, the active metamaterial device may further include a bias electrode formed at edges of the couple layer between the couple layer and the third dielectric layer.

In still other embodiments, the bias electrode may include second and third terminals extending outward from both opposing side walls.

In even other embodiments, the metamaterial patterns may include at least one metal of gold, chromium, silver, aluminum, copper, and nickel.

In yet other embodiments, the metamaterial patterns may have an H shape, window shape, or hexagonal shape.

In further embodiments, the first to third dielectric layers may include at least one polymer of polyimide, polymethyl methacrylate, polycarbonate, cycloolefin copolymer, or polyethylene terephthalate.

In still further embodiments, the first to third dielectric layers may further include at least one metal dielectric or inorganic dielectric of an aluminum oxide layer, a silicon oxide layer, a titanium oxide layer, or a magnesium fluoride layer.

In even further embodiments, the active metamaterial device may further include a gap-fill dielectric layer filled in the metamaterial patterns between the second dielectric layer and the couple layer.

In yet further embodiments, the lower electrode and the upper electrode may have a slit structure or net structure.

In other Embodiments of the present inventive concept, there are provided methods of manufacturing an active metamaterial device, the methods including: forming a first dielectric layer on a substrate; forming a lower electrode on the first dielectric layer; forming a second dielectric layer covering the lower electrode; forming metamaterial patterns on the second dielectric layer; forming a couple layer on the metamaterial patterns and the second dielectric layer; forming a third dielectric layer on the couple layer; forming an upper electrode on the third dielectric layer; forming a fourth dielectric layer on the upper electrode; and separating the substrate from the first dielectric layer.

In some embodiments, the couple layer may be formed by a scotch tape exfoliation method or chemical vapor deposition method.

In other embodiments, at least one of the lower electrode, the metamaterial patterns, and the upper electrode may be formed by an ink-jet printing method.

In still other embodiments, the method may further include forming a gap-fill dielectric layer to fill the metamaterial patterns.

In some embodiments, the gap-fill dielectric layer and the first to fourth dielectric layers may be formed by a spin coating method.

BRIEF DESCRIPTION OF THE DRAWINGS

The accompanying drawings are included to provide a further understanding of the present invention, and are incorporated in and constitute a part of this specification. The drawings illustrate exemplary Embodiments of the present inventive concept and, together with the description, serve to explain principles of the present invention. In the drawings.

DETAILED DESCRIPTION OF THE EMBODIMENTS

Figure 1:
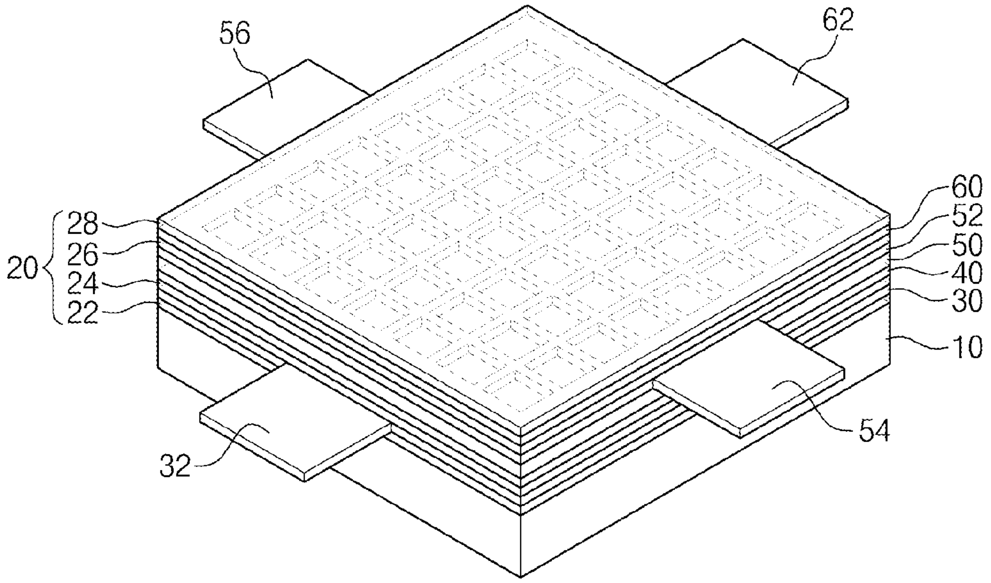
FIG. 1 is a perspective view illustrating an active metamaterial device according to an embodiment of the present inventive concept.

Hereinafter, preferred Embodiments of the present inventive concept will be described in more detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

In the following description, the technical terms are used only for explaining a specific exemplary embodiment while not limiting the present invention. The terms of a singular form may include plural forms unless referred to the contrary. The meaning of "comprises" and/or "comprising" specifies a property, a region, a fixed number, a step, a process, an element and/or a component but does not exclude other properties, regions, fixed numbers, steps, processes, elements and/or components. Since preferred embodiments are provided below, the order of the reference numerals given in the description is not limited thereto.

Figure 2:
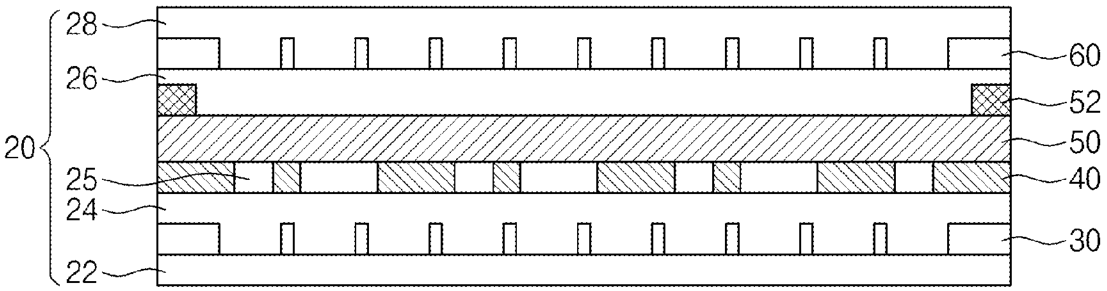
FIG. 2 is a cross-sectional view of FIG. 1.
Figure 3:
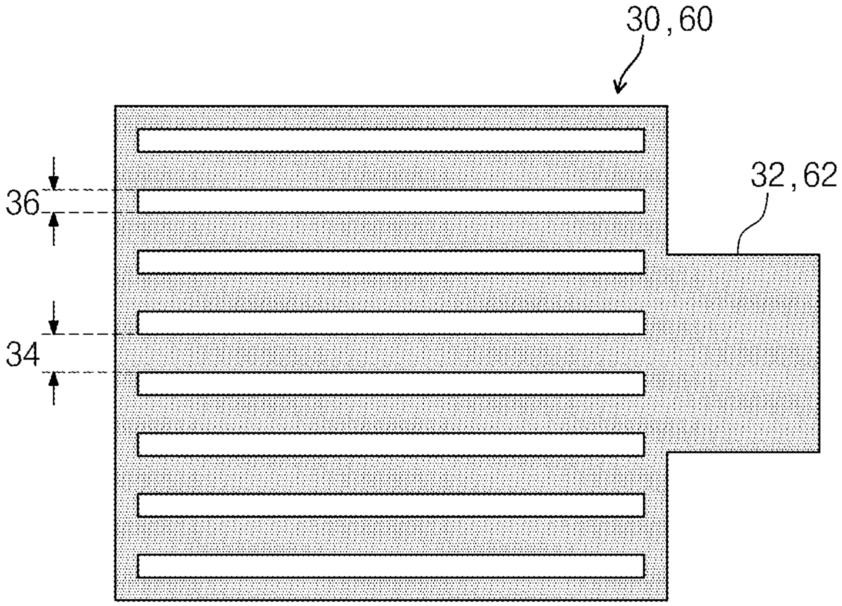
FIGS. 3 and 4 are plan views illustrating lower electrode and upper electrode of FIG. 1, respectively.
Figure 4:
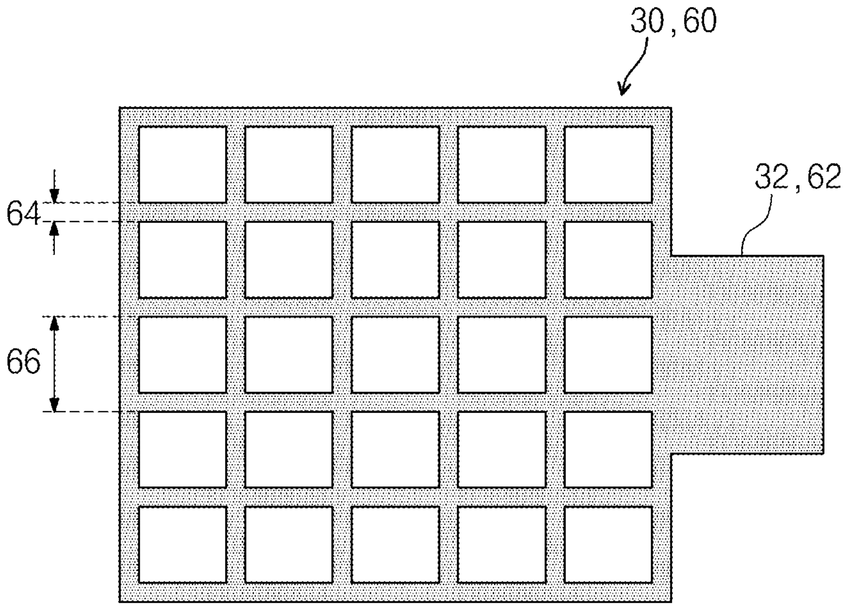
Figure 5:
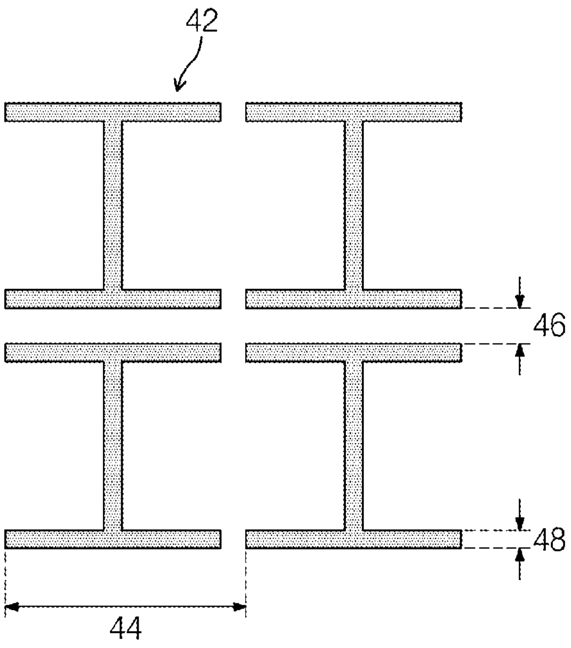
FIGS. 5 through 7 are plane views illustrating metamaterial metal patterns.
Figure 6:
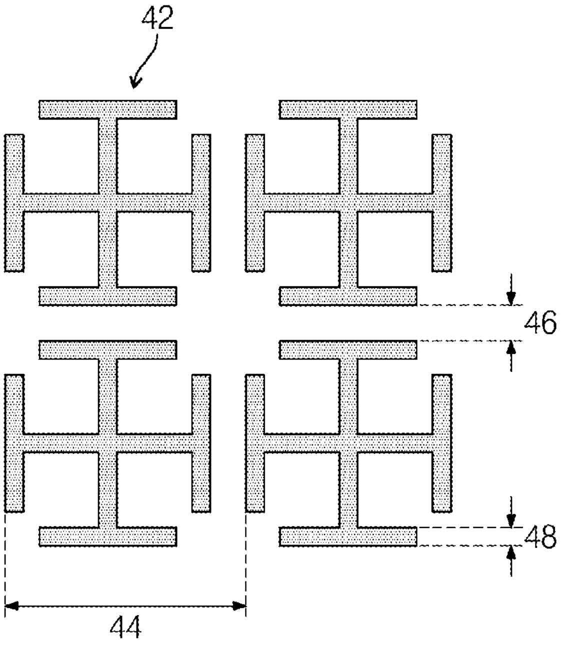
Figure 7:
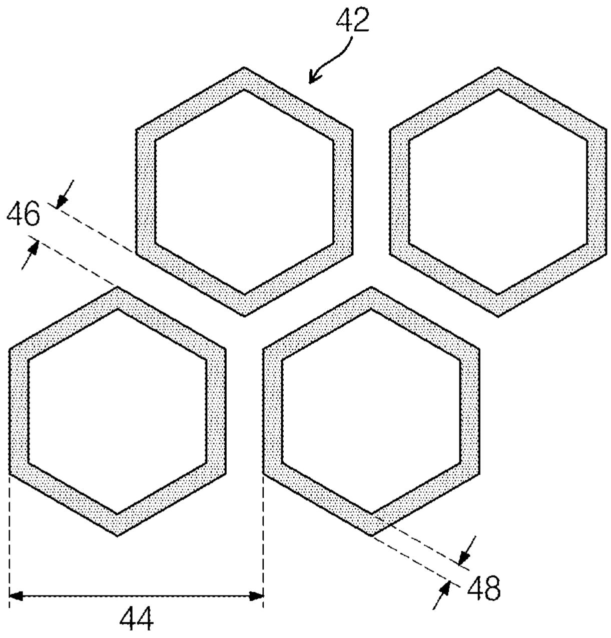

FIG. 1 is a perspective view illustrating an active metamaterial device according to an embodiment of the present inventive concept. FIG. 2 is a cross-sectional view of FIG. 1. FIGS. 3 and 4 are plan views illustrating lower electrode and upper electrode of FIG. 1, respectively. FIGS. 5 through 7 are plane views illustrating metamaterial metal patterns.

Referring to FIGS. 1 to 7, the active metamaterial device according to the embodiment of the present inventive concept may include a couple layer 50 disposed on a metamaterial metal pattern layer 40 between an upper electrode 60 and a lower electrode 30. The couple layer 50 may include graphene. Electrical conductivity of the graphene may be changed according to the intensity of an electric field induced between the upper electrode 60 and the lower electrode 30. For example, when the conductivity of the graphene is zero, the graphene may function as a sub-dielectric layer connected to the metamaterial metal pattern layer 40 and a gap-fill dielectric layer 25. The metamaterial metal pattern layer 40 and dielectric layers 20 may become a metamaterial structure. The metamaterial metal pattern layer 40 and the dielectric layers 20 may have a negative refractive index. When optical transmittance of the present metamaterial is one at DC frequency, the optical transmittance thereof will be zero at a resonance frequency of 1 THz. On the other hand, when the conductivity of the graphene is greater than zero, reflectance of the metamaterial metal patterns 40 may be increased through losing inherent characteristics of the metamaterial by a current applied from the graphene. At this time, the metamaterial metal patterns 40 may have a positive refractive index. The refractive index of the metamaterial metal patterns 40 may be adjusted according to an electric field applied between the lower electrode 30 and the upper electrode 60.

Therefore, the active metamaterial device according to the embodiment of the present inventive concept may switch the refractive index of the metamaterial metal patterns 40 at a high speed.

Graphene has a structure in which a honeycomb-shaped crystal form composed of six carbon atoms constituting a hexagon spreads like a thin sheet of paper. Transparency of the graphene is excellent. As described above, the conductivity of the graphene may be changed according to the intensity of the electric field between the lower electrode 30 and the upper electrode 60. A power supply voltage may be applied to the lower electrode 30 and the upper electrode 60 through first and fourth terminals 32 and 62 from the outside. The couple layer 50 may transfer a current input to and output from a bias electrode 52 to the metamaterial metal patterns 40. The bias electrode 52 may be disposed at edges of the couple layer 50. The bias electrode 52 may include second and third terminals 54 and 56 extending outward from both opposing side walls. A bias voltage may be applied to the bias electrode 52 and the couple layer 50 through the second and third terminals 54 and 56. The second and third terminals 54 and 56 may be arranged in an opposing direction in the bias electrode 52. The bias electrode 52 may include a metal having excellent conductivity, such as gold, silver, copper, and aluminum.

The dielectric layers 20 may include first to fourth dielectric layers 22, 24, 26 and 28 and the gap-fill dielectric layer 25. The second and third dielectric layers 24 and 26 may insulate the metamaterial metal patterns 40 and the couple layer 50 from the upper electrode 60 and the lower electrode 30. The first and fourth dielectric layers 22 and 28 may cover the upper electrode 60 and the lower electrode 30. The gap-fill dielectric layer 25 may be filled in the metamaterial metal patterns 40 on the second dielectric layer 24. The dielectric layers 20 may include a polymer having excellent transparency and flexibility, such as polyimide, polymethyl methacrylate, polycarbonate, cycloolefin copolymer, or polyethylene terephthalate. Also, the dielectric layers 20 may include at least one metal dielectric or inorganic dielectric of an aluminum oxide layer, a silicon oxide layer, a titanium oxide layer, or a magnesium fluoride layer.

Referring to FIGS. 3 and 4, the lower electrode 30 and the upper electrode 60 may have a slit structure or net structure. The lower electrode 30 and the upper electrode 60 may be disposed under and above the couple layer 50 and the metamaterial metal pattern layer 40, respectively. Also, the lower electrode 30 and the upper electrode 60 may be insulated from the couple layer 50 and the metamaterial metal pattern layer 40 by means of the second dielectric layer 24 and the third dielectric layer 26. A DC voltage changing the conductivity of the metamaterial metal pattern layer 40 may be applied to the lower electrode 30 and the upper electrode 60. The lower electrode 30 and the upper electrode 60 may have a thickness range of about 50 nm to about 200 nm. The slit-structured lower electrode 30 and upper electrode 60 may have a first line width 34 ranging from about 1 μm to about 3 μm and a distance 36 ranging from about 3 μm to about 5 μm. The net-structured lower electrode 30 and upper electrode 60 may include first unit cells having a second line width 64 ranging from about 2 μm to about 5 μm and a first size 66 ranging from about 40 μm to about 60 μm. Also, the net-structured lower electrode 30 and upper electrode 60 may transmit light regardless of a polarization direction of the light. The slit-structured lower electrode 30 and upper electrode 60 may transmit light polarized in a direction perpendicular to a longitudinal direction of the slit. The lower electrode 30 and the upper electrode 60 may include the first and fourth terminals 32 and 62, respectively. The lower electrode 30 and the upper electrode 60 may include a transparent electrode transmitting light having a terahertz frequency range. The lower electrode 30 and the upper electrode 60 may include an indium tin oxide (ITO) layer.

Referring to FIGS. 5 to 7, the metamaterial metal patterns 40 may have second unit cells 42 having an H shape, window shape, or hexagonal shape. The second unit cells 42 may have a size 44 ranging from about 40 μm to about 80 μand a cell gap 46 ranging from about 1 μm to about 5 μm. The metamaterial metal patterns 40 may have a third line width 48 ranging from about 3 μm to about 5 μm. The metamaterial metal patterns 40 may include at least one of gold, chromium, silver, aluminum, copper, and nickel. The metamaterial metal patterns 40 may lose properties of the metamaterial by a current applied from the couple layer 50.

Therefore, the active metamaterial device according to the embodiment of the present inventive concept may be operated at a higher speed than that of a typical one.

A method of manufacturing the active metamaterial device thus configured according to the embodiment of the present inventive concept will be described below.

FIGS. 8 through 18 are perspective views illustrating a method of manufacturing an active metamaterial device according to the embodiment of the present inventive concept.

Figure 8:
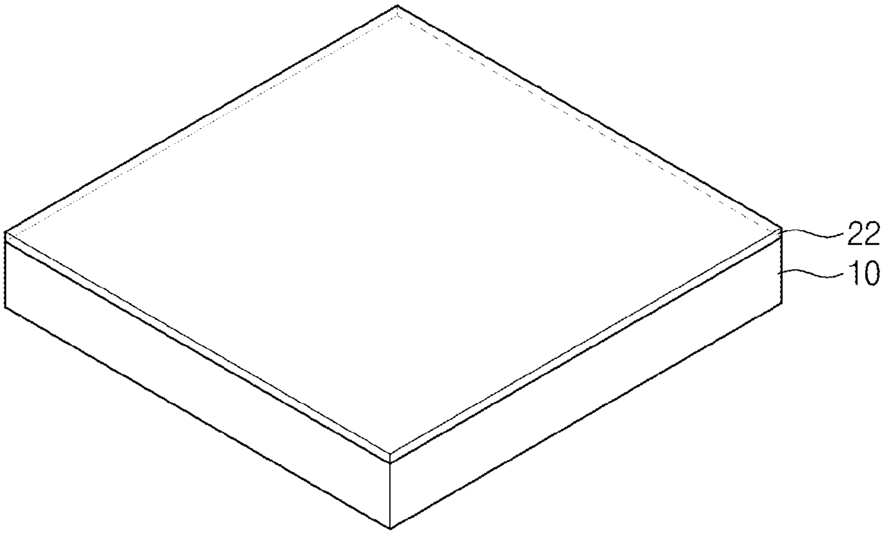
FIGS. 8 through 18 are perspective views illustrating a method of manufacturing an active metamaterial device according to the embodiment of the present inventive concept.

Referring to FIG. 8, a first dielectric layer 22 is formed on a substrate 10. The substrate 10 may include a silicon wafer or silicon on insulator (SOI) substrate, and a polydimethylsiloxane (PDMS) substrate. A first dielectric layer 22 may include a polymer, such as polyimide, polymethyl methacrylate, polycarbonate, cycloolefin copolymer, or polyethylene terephthalate, which is formed by a spin coating method. Also, the first dielectric layer 22 may include at least one metal dielectric or inorganic dielectric of an aluminum oxide layer, a silicon oxide layer, a titanium oxide layer, or a magnesium fluoride layer, which is formed by a chemical vapor deposition method, a sputtering method, or a rapid thermal processing method.

Figure 9:
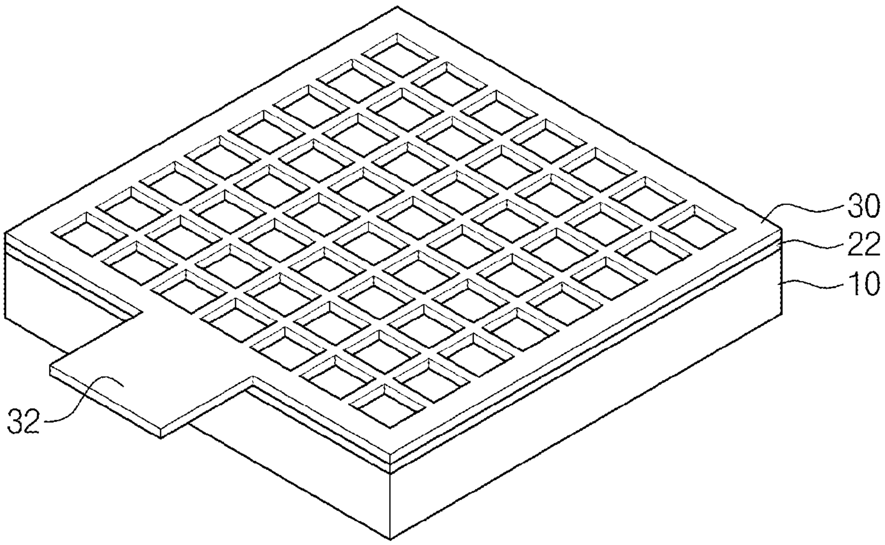

Referring to FIG. 9, a lower electrode 30 is formed on the first dielectric layer 22. The lower electrode 30 may be formed by photolithography and etching processes of a first metal layer deposited on the first dielectric layer 22. The first metal layer may include an indium tin oxide layer formed by an electron beam deposition method or sputtering method. Also, the lower electrode 30 may be formed by an ink jet-printing method of the first metal layer. A first terminal 32 of the lower electrode 30 protruding from sidewalls of the substrate 10 and the first dielectric layer 22 toward the outside is shown in FIG. 9, but the first terminal 32 may be formed on the first dielectric layer 22.

Figure 10:
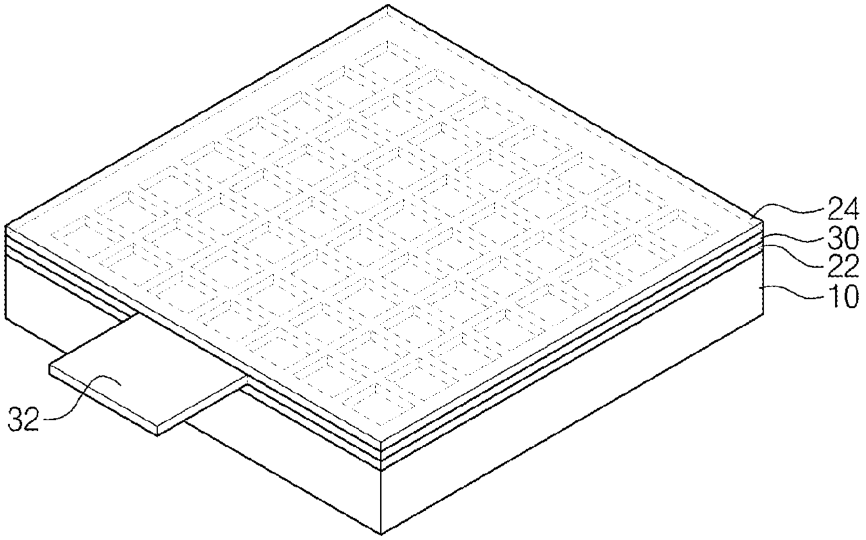

Referring to FIG. 10, a second dielectric layer 24 is formed on the lower electrode 30 and the first dielectric layer 22. The second dielectric layer 24 may include a polymer formed by a spin coating method. Also, the second dielectric layer 24 may include a metal dielectric or inorganic dielectric formed by chemical vapor deposition and sputtering methods.

Figure 11:
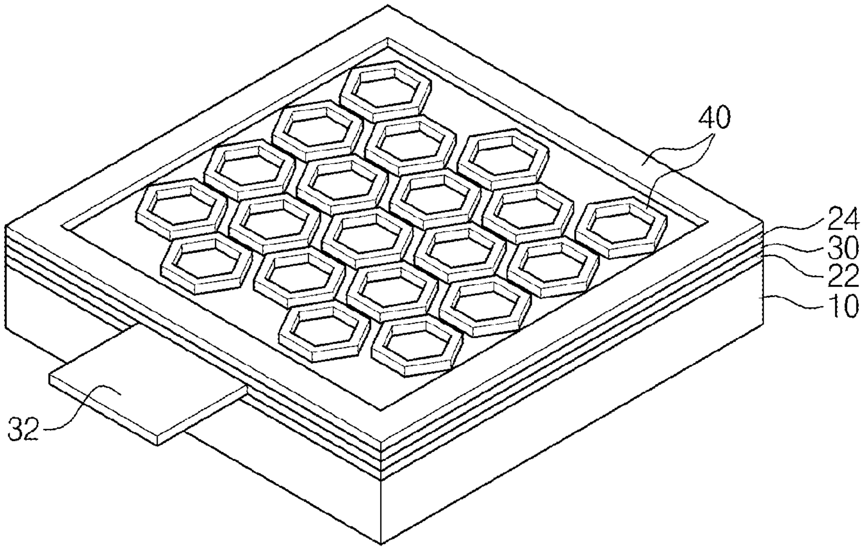

Referring to FIG. 11, metamaterial metal patterns 40 are formed on the second dielectric layer 24. The metamaterial metal patterns 40 may be formed by photolithography and etching processes of a deposited second metal layer. The second metal layer may include at least one of gold, chromium, silver, aluminum, copper, and nickel, which are formed by an electron beam deposition method. The metamaterial metal patterns 40 may be formed by an ink-jet printing method of the second metal layer.

Figure 12:
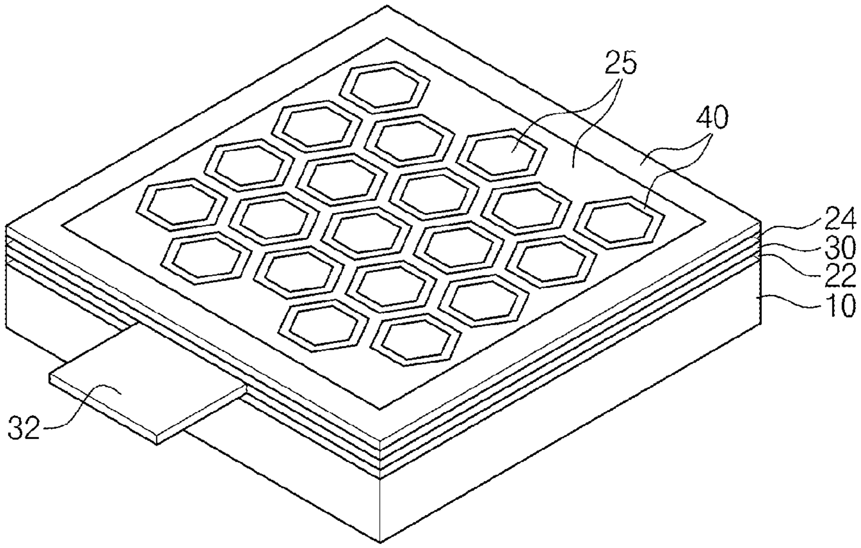

Referring to FIG. 12, a gap-fill dielectric layer 25 is formed on the second dielectric layer 24 exposed by the metamaterial metal patterns 40. The gap-fill dielectric layer 25 may remove a step height of the metamaterial metal patterns 40. The gap-fill dielectric layer 25 may include a polymer such as polyimide. A forming process of the gap-fill dielectric layer 25 may be omitted when the metamaterial metal patterns 40 are formed by an ink-jet printing method.

Figure 13:
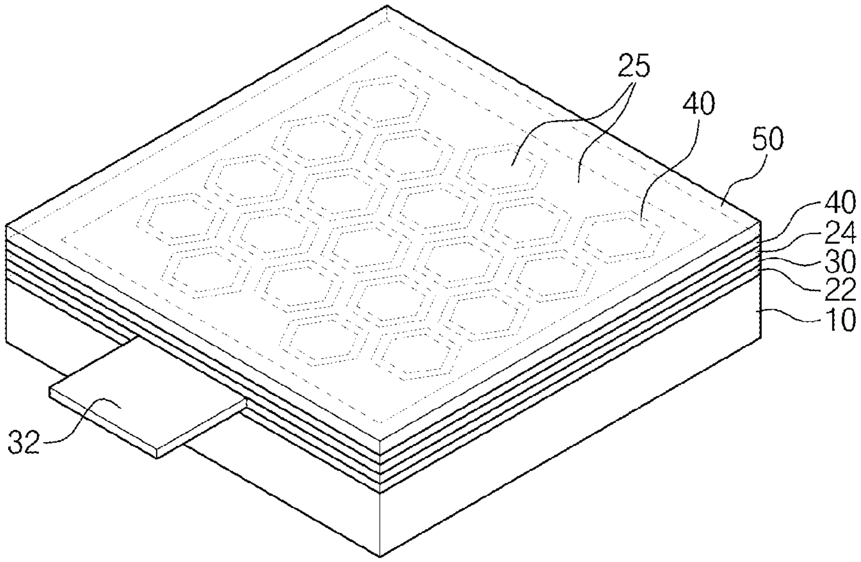

Referring to FIG. 13, a couple layer 50 is formed on the metamaterial metal patterns 40 and the gap-fill dielectric layer 25. The couple layer 50 may include graphene formed by a scotch tape exfoliation method or chemical vapor deposition method. The graphene may be formed within about ten layers.

Figure 14:
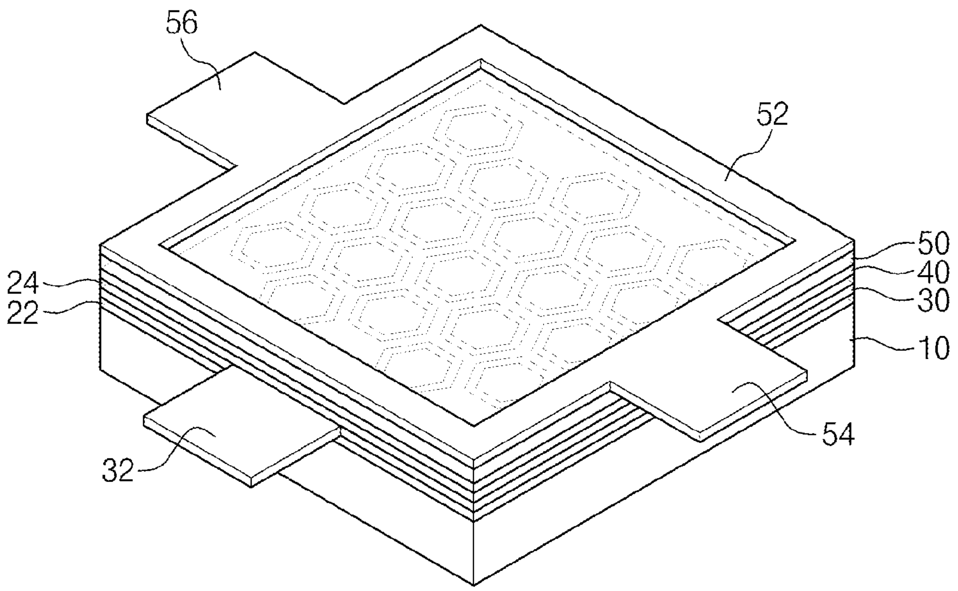

Referring to FIG. 14, a bias electrode 52 is formed around the couple layer 50. The bias electrode 52 may include at least one third metal layer of gold, chromium, silver, aluminum, copper, and nickel, which are formed by an ink-jet printing method. The bias electrode 52 may be formed by photolithography and etching processes of the third metal layer deposited on the couple layer 50. Second and third terminals 54 and 56 of the bias electrode 52 protrude from sidewalls of the substrate 10 and the couple layer 50 toward the outside, but the second and third terminals 54 and 56 may be formed on the second dielectric layer 24 or the gap-fill dielectric layer 25.

Figure 15:
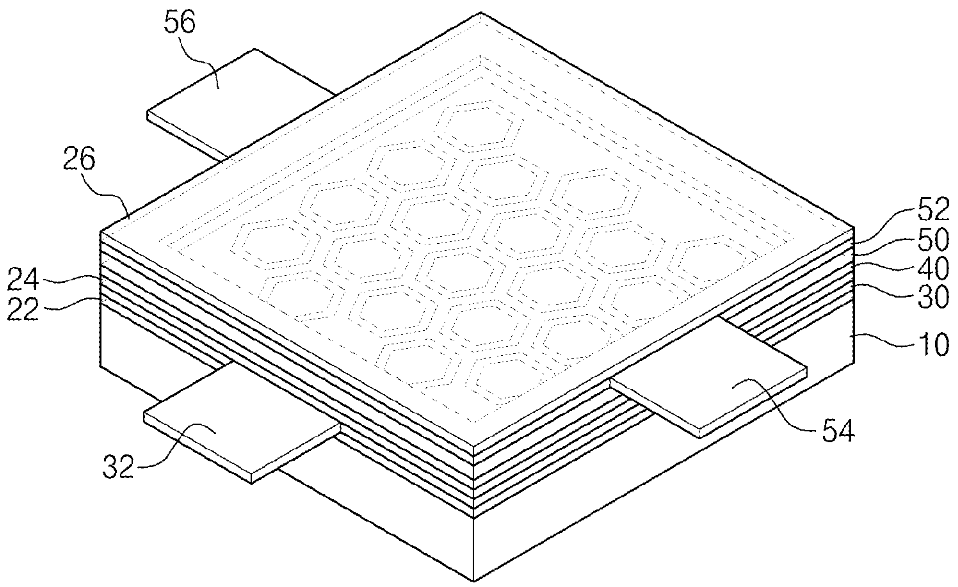

Referring to FIG. 15, a third dielectric layer 26 is formed on the bias electrode 52 and the couple layer 50. The third dielectric layer 26 may include a polymer formed by a spin coating method. Also, the third dielectric layer 26 may include a metal dielectric or inorganic dielectric formed by chemical vapor deposition and sputtering method.

Figure 16:
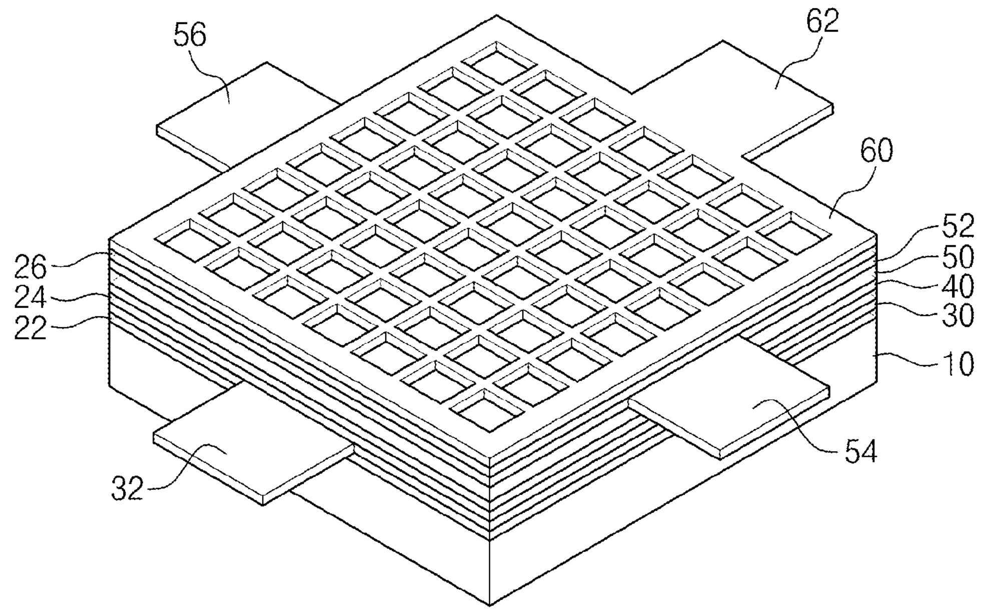

Referring to FIG. 16, an upper electrode 60 is formed on the third dielectric layer 26. The upper electrode 60 may be formed by photolithography and etching processes of a fourth metal layer deposited on the third dielectric layer 26. The upper electrode 60 may include an indium tin oxide layer formed by an electron beam deposition method or sputtering method. Also, the upper electrode 60 may be formed by an ink-jet printing method of the fourth metal layer. A fourth terminal 62 of the upper electrode 60 protrudes from sidewalls of the substrate 10 and the third dielectric layer 26 toward the outside, but the fourth terminal 62 may be formed on the third dielectric layer 26.

Figure 17:
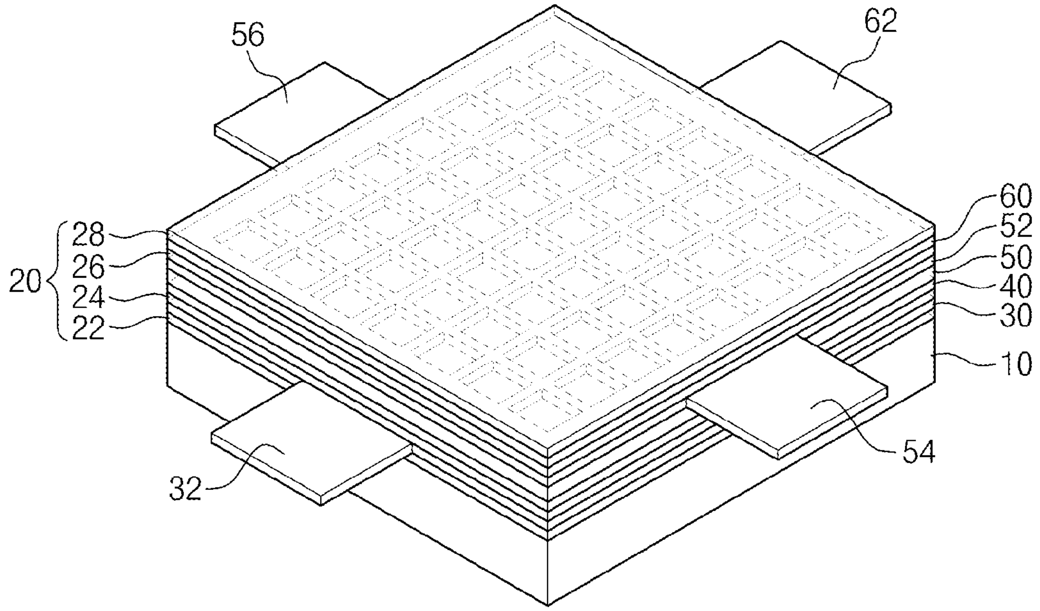

Referring to FIG. 17, a fourth dielectric layer 28 is formed on the upper electrode 60 and the third dielectric layer 26. The fourth dielectric layer 28 may include a polymer formed by a spin coating method. Also, the fourth dielectric layer 28 may include a metal dielectric or inorganic dielectric formed by chemical vapor deposition and sputtering methods.

Figure 18:
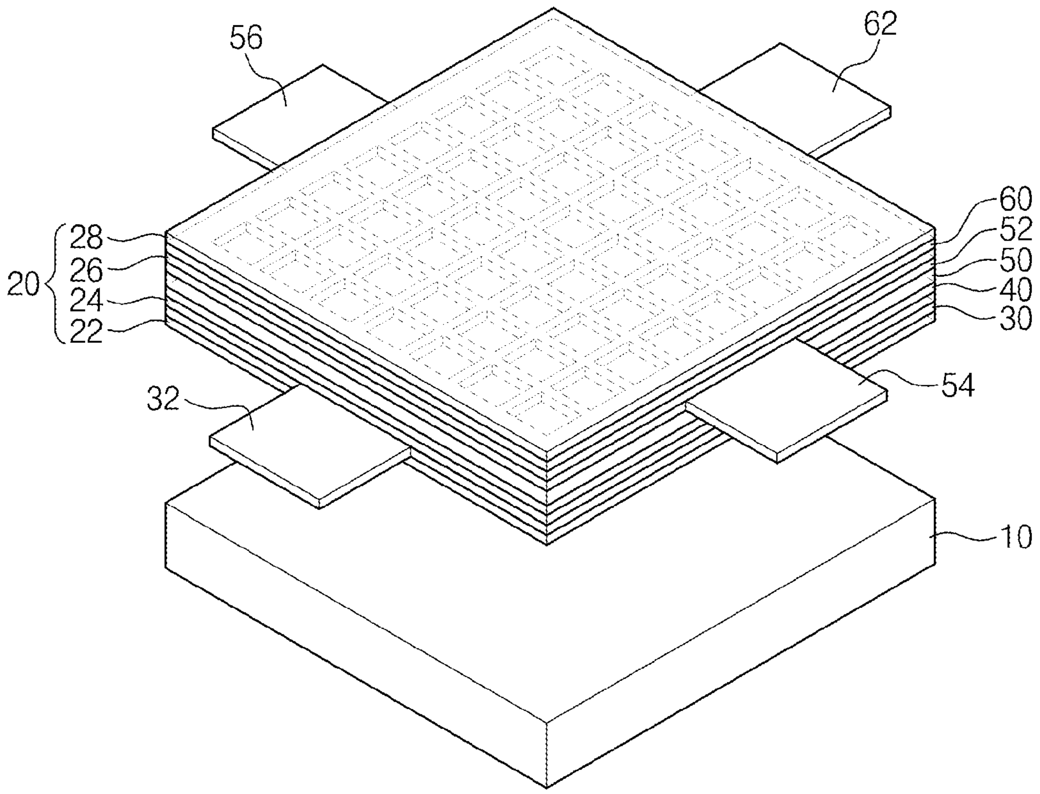

Referring to FIG. 18, the substrate 10 is separated from the first dielectric layer 22. The substrate 10 may be peeled off from the first dielectric layer 22. Also, the substrate 10 may be crushed.

As described above, according to an embodied configuration of the present invention, a couple layer electrically connected to metamaterial metal patterns between upper electrode and lower electrode is included. The couple layer may include graphene. Electrical conductivity of the graphene may be changed according to an electric field induced from the upper electrode and the lower electrode. A refractive index of the metamaterial metal patterns may be changed by a current applied through the graphene. Therefore, an active metamaterial device according to an embodiment of the present inventive concept may be operated at a high speed. Dielectric layers insulate the metamaterial metal patterns between the upper electrode and the lower electrode. The dielectric layers may include a polymer having excellent flexibility.

While the present invention has been particularly shown and described with reference to exemplary embodiments thereof, it will be understood by those of ordinary skill in the art that various changes in form and details may be made therein without departing from the spirit and scope of the present invention as defined by the following claims. Thus, the above-disclosed subject matter is to be considered illustrative, and not restrictive.

What is claimed is:

1. An active metamaterial device comprising:

a first dielectric layer;

a lower electrode over the first dielectric layer;

a second dielectric layer over the lower electrode;

metamaterial patterns over the second dielectric layer;

a couple layer on the metamaterial patterns and the second dielectric layer, wherein the couple layer comprises graphene;

a third dielectric layer over the couple layer;

an upper electrode over the third dielectric layer; and a bias electrode provided at edges of the couple layer between the couple layer and the third dielectric layer, wherein the bias electrode comprises second and third terminals extending outward from opposing side walls.

2. The active metamaterial device of claim 1, wherein the metamaterial patterns comprise at least one metal of gold, chromium, silver, aluminum, copper, and nickel.

3. The active metamaterial device of claim 1, wherein the metamaterial patterns have all kinds of the metamaterial patterns including an H shape, window shape, or hexagonal shape.

4. The active metamaterial device of claim 1, wherein the first to third dielectric layers comprise at least one polymer of polyimide, polymethyl methacrylate, polycarbonate, cycloolefin copolymer, or polyethylene terephthalate.

5. The active metamaterial device of claim 4, wherein the first to third dielectric layers further comprise at least one metal dielectric or inorganic dielectric of an aluminum oxide layer, a silicon oxide layer, a titanium oxide layer, or a magnesium fluoride layer.

6. The active metamaterial device of claim 5, further comprising a gap-fill dielectric layer filled in the metamaterial patterns between the second dielectric layer and the couple layer.

7. The active metamaterial device of claim 1, wherein the lower electrode and the upper electrode have a slit structure or net structure.

8. A method of manufacturing an active metamaterial device, the method comprising:

forming a first dielectric layer over a substrate;

forming a lower electrode over the first dielectric layer;

forming a second dielectric layer covering the lower electrode;

forming metamaterial patterns over the second dielectric layer;

forming a couple layer over the metamaterial patterns and the second dielectric layer;

forming a bias electrode at edges of the couple layer;

forming a third dielectric layer over the couple layer and the bias electrode;

forming an upper electrode over the third dielectric layer;

forming a fourth dielectric layer over the upper electrode; and separating the substrate from the first dielectric layer, wherein the bias electrode comprises second and third terminals extending outward from opposing side walls, and wherein the couple layer comprises graphene.

9. The method of claim 8, wherein the couple layer is formed by a scotch tape exfoliation method or chemical vapor deposition method.

10. The method of claim 8, wherein at least one of the lower electrode, the metamaterial patterns, and the upper electrode is formed by an ink-jet printing method.

11. The method of claim 8, further comprising forming a gap-fill dielectric layer to fill the metamaterial patterns.

12. The method of claim 11, wherein the gap-fill dielectric layer and the first to fourth dielectric layers are formed by a spin coating method.

* * * * *